(12) United States Patent
Phillips, III et al.

(10) Patent No.: US 9,121,961 B2
(45) Date of Patent: Sep. 1, 2015

(54) SEISMIC FREQUENCY SWEEP ENHANCEMENT

(71) Applicants: Thomas F. Phillips, III, Richmond, TX (US); Zhouhong Wei, Sugar Land, TX (US)

(72) Inventors: Thomas F. Phillips, III, Richmond, TX (US); Zhouhong Wei, Sugar Land, TX (US)

(73) Assignee: INOVA LTD., Houston, TX (US)

( * ) Notice: Subject to any disclaimer, the term of this patent is extended or adjusted under 35 U.S.C. 154(b) by 395 days.

(21) Appl. No.: 13/621,578

(22) Filed: Sep. 17, 2012

(65) Prior Publication Data

US 2013/0250733 A1    Sep. 26, 2013

Related U.S. Application Data

(60) Provisional application No. 61/535,767, filed on Sep. 16, 2011.

(51) Int. Cl.
*G01V 1/04* (2006.01)
*G01V 1/147* (2006.01)
*G01V 1/00* (2006.01)

(52) U.S. Cl.
CPC ............... *G01V 1/147* (2013.01); *G01V 1/005* (2013.01); *G01V 1/04* (2013.01)

(58) Field of Classification Search
CPC .......... G01V 1/147; G01V 1/005; G01V 1/04
USPC ................................................. 367/189–190
See application file for complete search history.

(56) References Cited

U.S. PATENT DOCUMENTS

| | | | |
|---|---|---|---|
| 7,327,633 B2 | 2/2008 | Bagaini et al. | |
| 7,974,154 B2 | 7/2011 | Bagaini et al. | |
| 2006/0018192 A1* | 1/2006 | Jeffryes et al. | 367/41 |
| 2010/0199772 A1 | 8/2010 | Bagaini | |
| 2010/0232260 A1 | 9/2010 | Zowarka et al. | |
| 2012/0037444 A1* | 2/2012 | Eick et al. | 181/114 |

OTHER PUBLICATIONS

PCT/US2012/055772—International Search Report dated Aug. 19, 2013.

* cited by examiner

*Primary Examiner* — Ian J Lobo
(74) *Attorney, Agent, or Firm* — Mossman, Kumar & Tyler PC

(57) ABSTRACT

A method of performing a seismic sweep includes forming a composite force profile; constructing a target seismic frequency sweep using the composite force profile; and operating a seismic source using the constructed target frequency seismic sweep.

13 Claims, 8 Drawing Sheets

SEISMIC FREQUENCY SWEEP ENHANCEMENT

CROSS-REFERENCE TO RELATED APPLICATIONS

This application claims priority from U.S. Provisional Application Ser. No. 61/535,767 dated Sep. 16, 2011, the disclosure of which is incorporated herein by reference in its entirety.

BACKGROUND OF THE DISCLOSURE

1. Field of the Disclosure

The present disclosure generally relates to seismic prospecting and in particular to methods and apparatus for generating seismic source signals with enhanced seismic frequency sweeps.

2. Description of the Related Art

In the oil and gas exploration industry, geophysical tools and techniques are commonly employed in order to identify a subterranean structure having potential hydrocarbon deposits. Many different techniques are used to generate a seismic signal.

Seismic vibratory energy sources have been used in the field many years. A seismic vibrator in its simplest form is merely a heavy vehicle that has the ability to shake the ground at a predetermined range of frequencies of about 2 to 300 Hz. The vibrator imparts a signal into the subsurface of the earth over a relatively long period of time, which allows for an energy level less than impulse generators such as dynamite.

The imparted energy, known as the seismic source signal or "pilot" signal, travels through the subsurface and reflects some of the energy from certain subsurface geological boundaries or layers. The reflected energy is then transmitted back to the earth's surface where it is recorded using an earth motion detector. The recorded data is processed to yield information about a location and physical properties of layers making up the subsurface.

The seismic vibrator source signal is typically a sweep signal, or simply sweep. Sweeps are sinusoidal vibrations in the 2-300 Hz range described above and having a duration on the order of 2 to 40 seconds depending on the terrain, the subsurface lithology, economic constraints and physical capabilities of the vibrator. The sinusoidal sweep can be increased in frequency overtime, which is called an "upsweep." The upsweep is the signal used typically in modern seismic exploration. Also, the sinusoidal sweep can be decreased in frequency overtime, which is called a "downsweep." The end products of the vibrator sweep are waves that propagate through the earth to return clues about the subsurface.

The present disclosure provides methods and devices for enhancing seismic sweeps.

SUMMARY OF THE DISCLOSURE

In aspects, the present disclosure provides a method of performing a seismic sweep. The method may include forming a composite force profile; constructing a target seismic frequency sweep using the composite force profile; and operating a seismic source using the constructed target frequency seismic sweep. The composite force profile may be formed by obtaining two or more force profiles using the following methodologies: one or more steady state sweeps; one or more transient force sweeps; one or more transient frequency sweeps; and one or more transient force and frequency sweeps.

In aspects, the present disclosure also provides a computer-readable medium having a computer program embedded therein and accessible to a processor for executing the computer program. The computer program may include instructions to form a composite force profile and instructions to construct a target seismic frequency sweep using the composite force profile. The computer program may also include instructions to operate a seismic source using the constructed target frequency seismic sweep.

BRIEF DESCRIPTION OF THE DRAWINGS

For detailed understanding of the present disclosure, references should be made to the following detailed description of the preferred embodiment, taken in conjunction with the accompanying drawings, in which like elements have been given like numerals and wherein.

DETAILED DESCRIPTION OF THE DISCLOSURE

As will be appreciated from the discussion below, aspects of the present disclosure provide methods of performing enhanced seismic sweep. Vibrator behavior can depend on the method used to generate a force profile. In one aspect, this enhancement is obtained by controlling the behavior of a seismic vibrator by building a composite force profile. The resultant of this procedure is to determine the optimal force profile of the vibrator based on the goal of the resultant sweep. One aspect of these methods is constructing a target seismic frequency sweep using a composite force profile. The target frequency seismic sweep may includes a frequency sweep that includes a single frequency; a frequency sweep that increases frequency with time; a frequency sweep that decreases frequency with time; a frequency sweep that includes a single frequency and increasing frequencies; a frequency sweep that includes a single frequency and decreasing frequencies; or a frequency sweep that includes a single frequency and increasing frequencies and decreasing frequencies. The power spectrum, sweep length, or target force all individually or collectively impact and vary the composite force profile.

The composite force profile may be based on one or more experimental sweeps, such as a force profile using one or more steady state sweeps, a force profile using one or more transient force sweeps, a force profile using one or more transient frequency sweeps and a force profile using one or more transient force and frequency sweeps. The target seismic frequency sweep may then be used to operate a vibratory seismic source.

Figure 1:
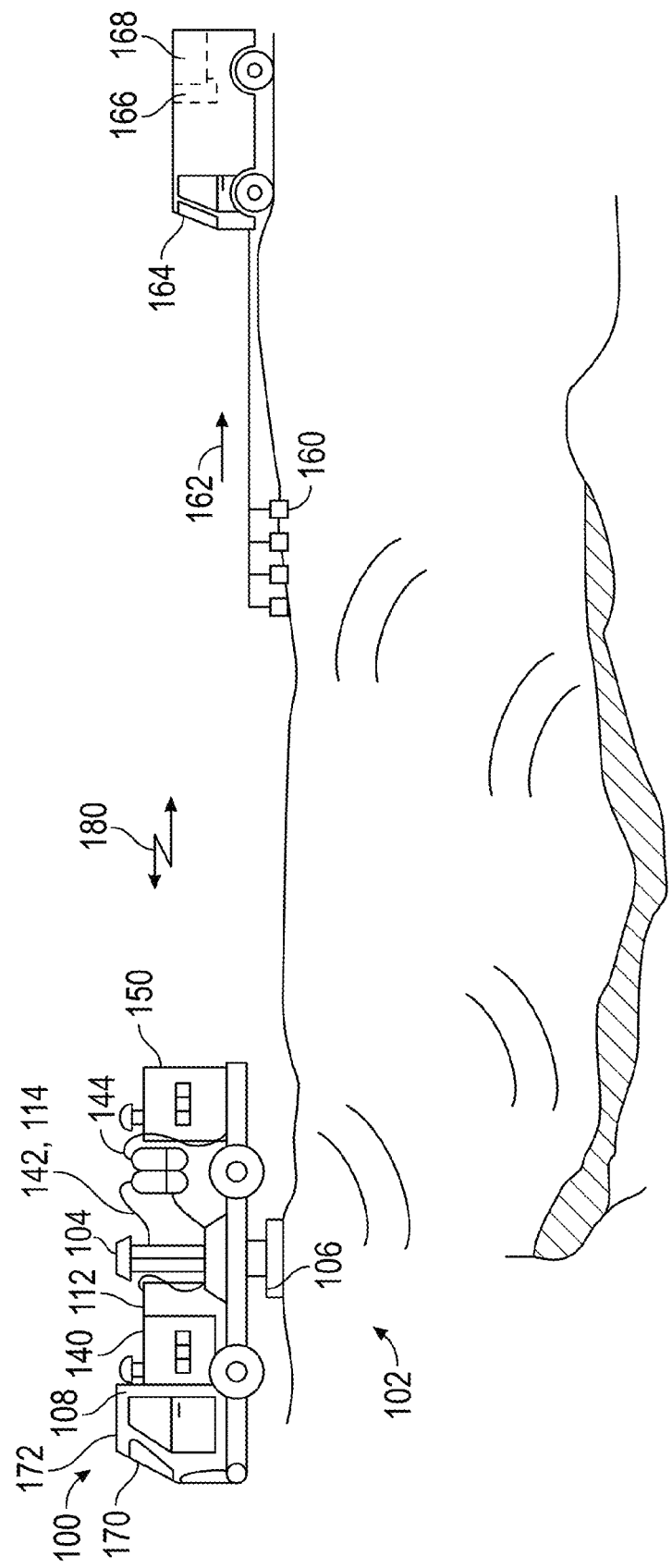
FIG. 1 illustrates a typical seismic data acquisition operation utilizing aspects of the present disclosure.

FIG. 1 depicts a geophysical survey layout that may use target seismic frequency sweeps developed in accordance with embodiments of the present disclosure. A seismic source 100 is positioned at a predetermined location in an area of exploration and coupled to the earth. In the embodiment shown the seismic source 100 is a truck-carried vibratory seismic source. The vibratory seismic source 100 may be a single axis source imparting, for example, only compression P-waves into the earth. Those skilled in the art would recognize that a multi-axis vibratory source capable of imparting both P and S waves into the earth can be configured according to the present disclosure described in detail herein below without additional illustration or description. Therefore, the present disclosure will focus on a single axis seismic source for brevity and without limiting the scope of the disclosure.

The seismic source 100 includes a truck 170 having a cab 172 housing a controller 108. The seismic source includes a hydraulic subsystem 140 used to move a reaction mass 104. As will be described in more detail in reference to FIG. 2, the moving reaction mass 104 acts upon a base plate 106 to impart a seismic source signal 102 into the earth. The signal 102 travels through the earth, reflects at discontinuities and formations, and travels toward the earth's surface.

A plurality of sensors 160 are coupled to the earth in an array spaced apart from the seismic source 100. The sensors 160 detect the reflected source signal 102, and electrical signals 162, which may be digital and/or analog, are transmitted from the array of sensors 160 to a recording station (not shown) typically housed in a truck. The recording station includes a seismic recorder 168 and may also include a correlation processor, which also receives an electrical signal 180 indicative of the actual source signal 102 imparted into the earth.

Still referring to FIG. 1, the seismic source 100 comprises several subsystems having system components used in generating the seismic signal 102. The system 100 includes a hydraulic pump subsystem 140 having hydraulic lines 142 carrying hydraulic fluid 114 to a servo valve assembly 112. A cooler 150 is typically present to cool the hydraulic subsystem. Low frequency accumulators 144 mounted on the truck are relatively large, e.g., about ten gallons or more, and serve to dampen low frequency noise, e.g. about 25 Hz or less, caused by operation of the hydraulic system.

Figure 2:
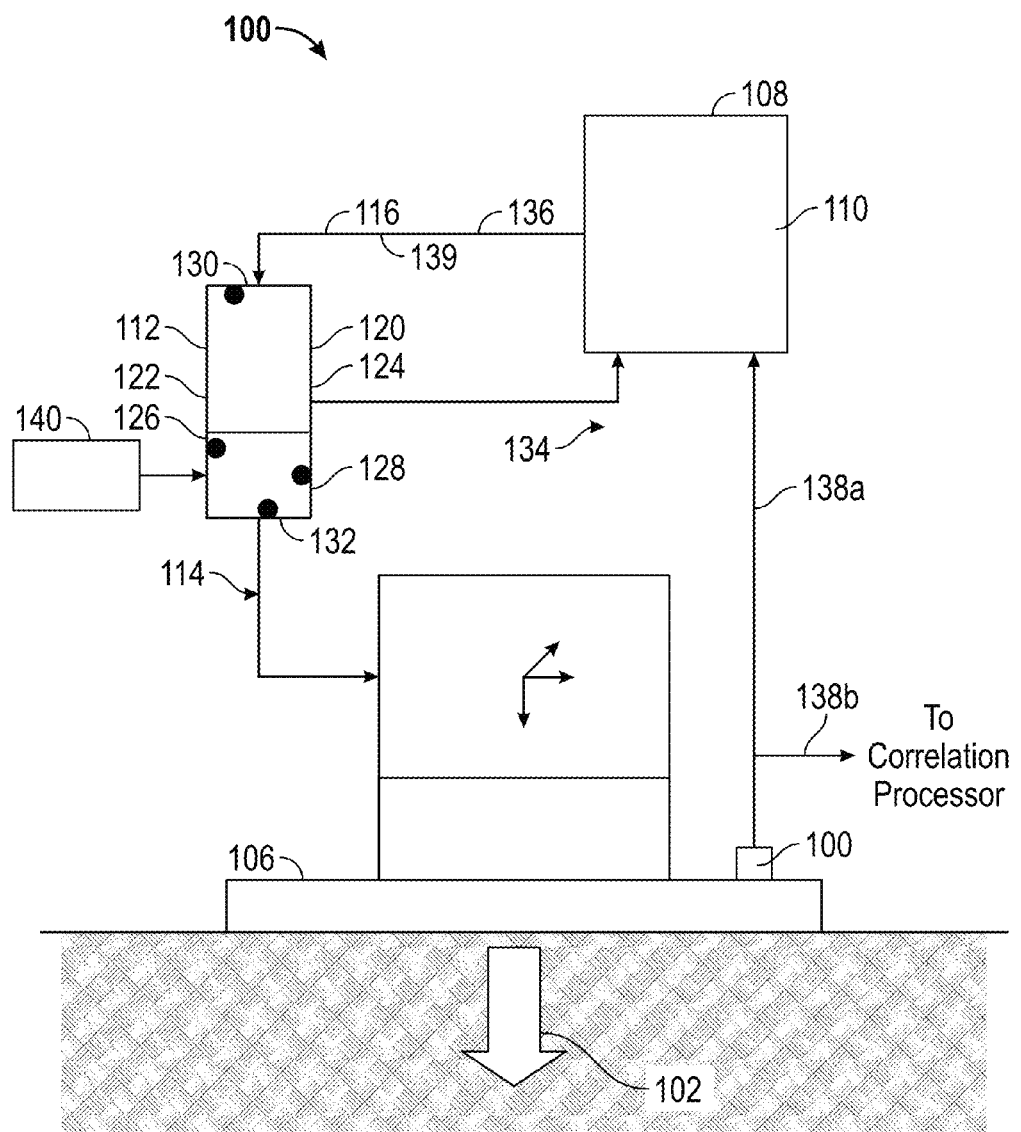
FIG. 2 is a schematic representation of functional features of a vibratory seismic source such as the source of FIG. 1.

FIG. 2 schematically illustrates a seismic signal generating system 100 substantially as described above and shown in FIG. 1 for imparting a sinusoidal seismic signal 102 into the earth. Reference numerals are aligned with the like components of FIG. 1. The base plate 106 is coupled via static weight to the earth. The reaction mass 104 is movably coupled to the base plate 106 such that controlled movement of the reaction mass 104 via the hydraulic subsystem 140 vibrates the base plate 106 at a desired amplitude and frequency or sweep to generate the signal 102. The controller 108 includes a processor 110 for controlling the system 100. The controller is electrically coupled to the servo valve assembly 112. The servo valve assembly 112 includes a servo motor 120, a pilot valve 122 and a main stage valve 124.

The servo valve assembly 112 controls fluid movement in the hydraulic subsystem 140, which provides a force for moving the reaction mass 104. An electrical signal 116 having characteristics of the desired sweep signal is transmitted from the controller 108 to the servo motor, which operates the pilot valve 122. The pilot valve 122 is coupled to the main stage valve 124 and includes a hydraulic coupling for transferring hydraulic pressure to operate the main stage valve. When operated, the main stage valve pressurizes and depressurizes hydraulic passages (not shown) to move the reaction mass 104 according to the controller signal.

In aspects of the disclosure the seismic signal 102 is created by regulating the flow of the pressurized hydraulic fluid 114 against the reaction mass 104, forcing the reaction mass 104 to reciprocate vertically rapidly and repeatedly. Acoustic characteristics of this vibration are controlled by regulating the flow of the hydraulic fluid 114 to adjust the speed and force of the reaction mass 104.

Figure 3:
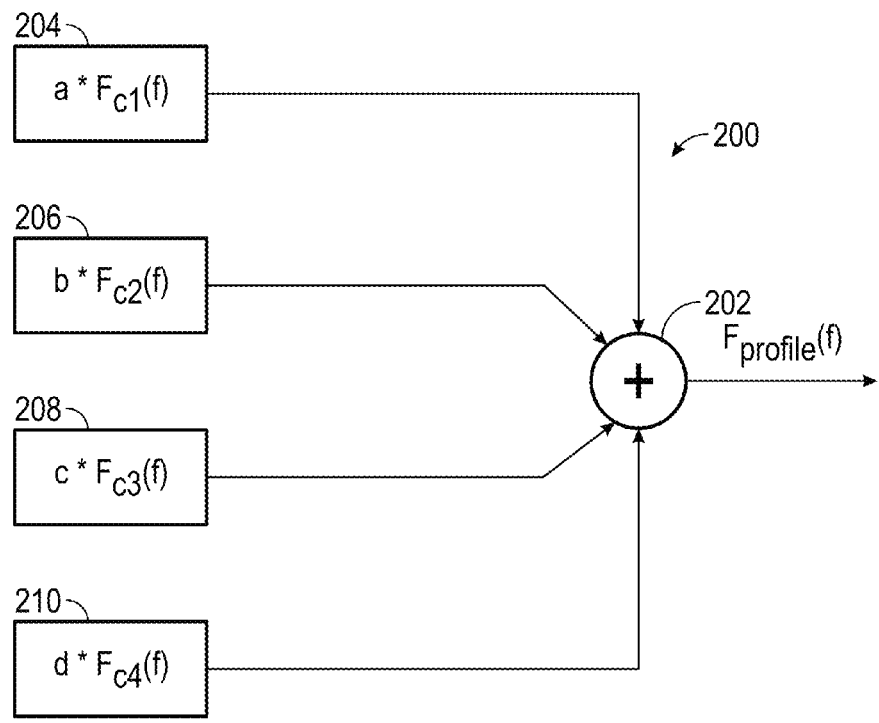
FIG. 3 illustrates a method for generating a composite force profile in accordance with one embodiment of the present disclosure.

Referring now to FIG. 3, there is shown one method 200 for constructing a composite force profile 202. The method 200 may include an experimentally derived force profile using one or more steady state sweeps 204, a force profile using one or more transient force sweeps 206, a force profile using one or more transient frequency sweeps 208, and a force profile using one or more transient force and frequency sweeps 210. These experimentally derived force profiles 204-210 may be correlated or combined to obtain the composite force profile 202. For example, in one embodiment, a mathematical operation, such as a weighted average, may be used to combine the force profiles 204-210. In other embodiments, historical or empirical data may be used to adjust any or all of the force profiles 204-210. In still other embodiments, one or more of the experimentally derived force profiles 204-210 may be omitted. Each of the experimental force profiles 204-210 are discussed below with reference to FIGS. 4-7.

Figure 4A:
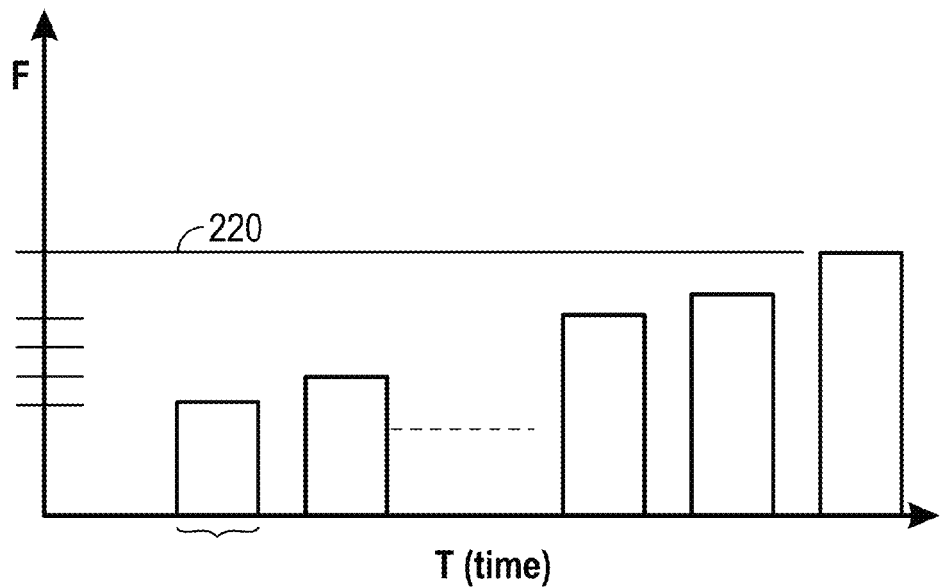
FIG. 4A illustrates a test sweep generated using a steady state method in accordance with one embodiment of the present disclosure.
Figure 4B:
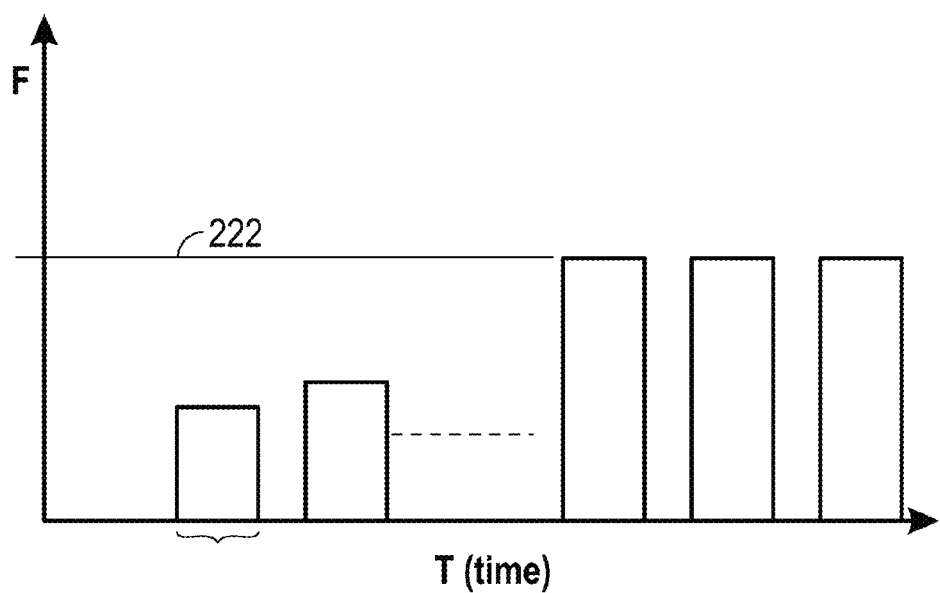
FIG. 4B illustrates a fundamental force identified using the FIG. 4A test sweep.

FIGS. 4A-B illustrate how the steady state method may be used to generate force profile data. The graphs show driving force (F) versus time (T) and represent an illustrative force profile at a selected frequency. As shown in FIG. 4A, at each frequency, the target driving force is increased over a selected range of frequencies. The maximum force is labeled with numeral 220. FIG. 4B shows a steady state condition occurring at an output force value 222 (or fundamental force). System behavior is monitored for each force interval until steady state is detected (e.g., force value 222) for that frequency. The system behavior information collected during these tests may be processed after testing is completed. This processing may include filtering, sorting, converting, and other known analysis techniques in order to identify optimal force values.

In FIGS. 4A-B, the time (t) that the force is generated is held constant, but this is not always required. This process is performed at all the frequencies in the desired frequency range to generate a data set of force values and associated frequencies. Thus, generally, the steady state method estimates a driving force at each frequency by applying one or more selected forces for a predetermined time period. Then the predetermined time period may be selected to cause the driving force to at least exceed a transient response.

Figure 5A:
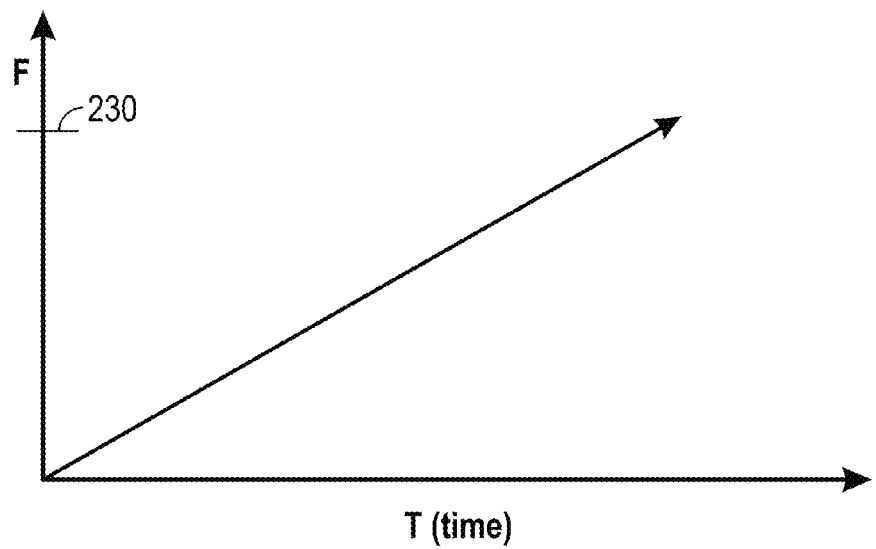
FIG. 5A illustrates a test sweep generated using a transient force method in accordance with one embodiment of the present disclosure.
Figure 5B:
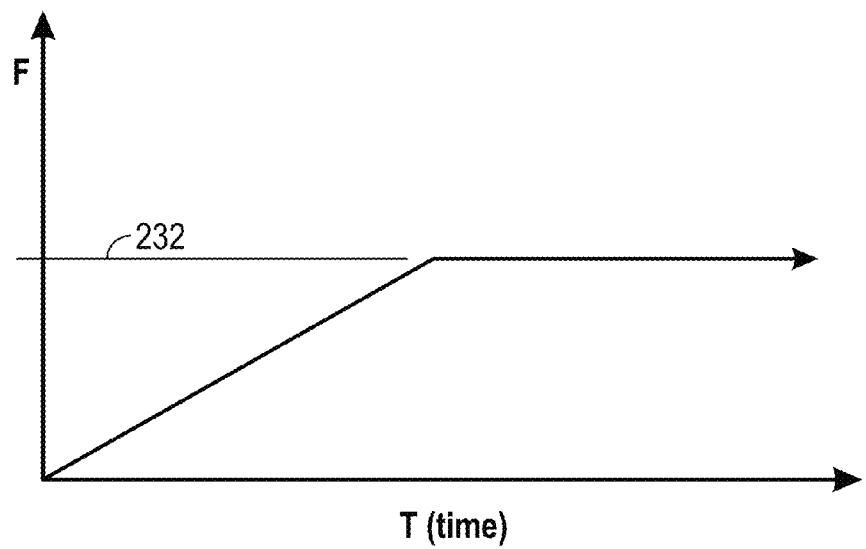
FIG. 5B illustrates a fundamental force identified using the FIG. 5A test sweep.

FIGS. 5A-B illustrate how a transient force method may be used to generate force profile data. The graphs show driving force (F) versus time (T) and represent an illustrative force profile at a selected frequency. As shown in FIG. 5A, the driving force is ramped up linearly from zero to a calculated maximum force 230 over a time period (e.g., 20 seconds) for each frequency. FIG. 5B shows a steady state condition occurring at an output force value 232 (or fundamental force). System behavior is monitored for each force interval until steady state is detected (e.g., force value 232). The system behavior information collected during these tests may be processed after testing is completed and analyzed to identify optimal force values.

The force value 232 may be selected as the force for that frequency.

Figure 6A:
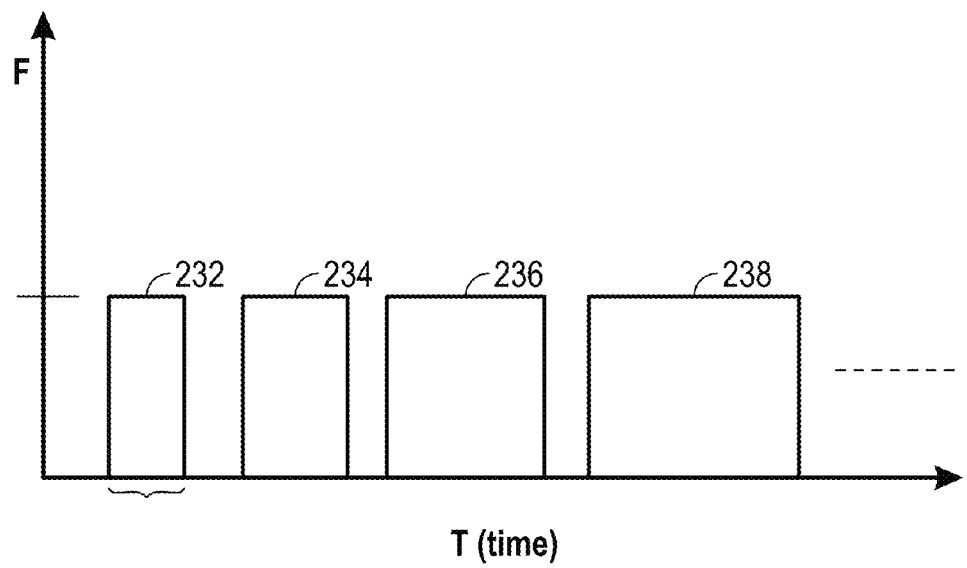
FIG. 6A illustrates a test sweep generated using a transient frequency method in accordance with one embodiment of the present disclosure.
Figure 6B:
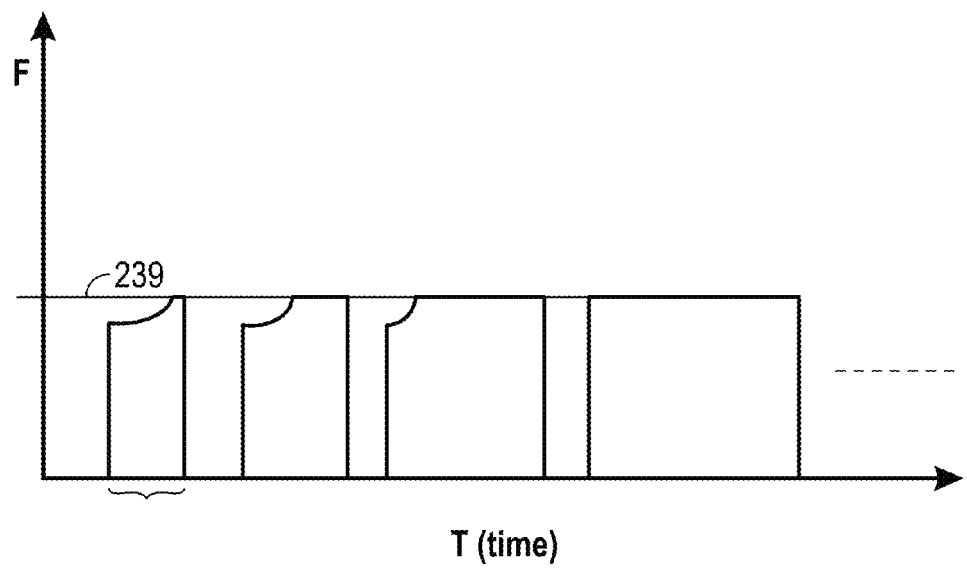
FIG. 6B illustrates a preferred time for a frequency using the FIG. 6A test sweep.
Figure 6C:
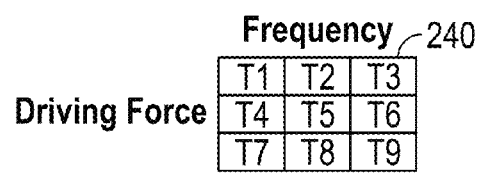
FIG. 6C illustrates a table of times associated with driving force values over a range of frequencies obtained using the transient frequency method.

FIGS. 6A-B show the transient frequency sweep method. The graph shows driving force (F) versus time (T) and represents an illustrative force profile at a selected frequency. While FIG. 6A shows a constant frequency, the method may also use a range of frequencies. As shown in FIG. 6A, the force is held constant and the time is increased to determine the sweep time to excite resonances in the vibrator system. In other methodologies, the time may be increased to determine other operating characteristics or parameters. For example, the time may be increased to determine the minimum duration across multiple frequencies so that adequate vibrator performance is achieved, such as pump flow. Thus, force intervals 232-238, each have successively increasing lengths. The time is then held below the time that could excite resonances. As shown in FIG. 6B, the vibrator performance at each time period may be analyzed to estimate when the response is acceptable. In FIG. 6B, an acceptable response may be considered to occur at force 239. Thus, the transient frequency sweep method generally estimates a driving force by sweeping through a selected frequency range and remaining at each frequency for varying time periods. From FIG. 6B, the acceptable times are entered into a table 240 shown in FIG. 6C, where a force is associated with a preferred time for each frequency.

Figure 7A:
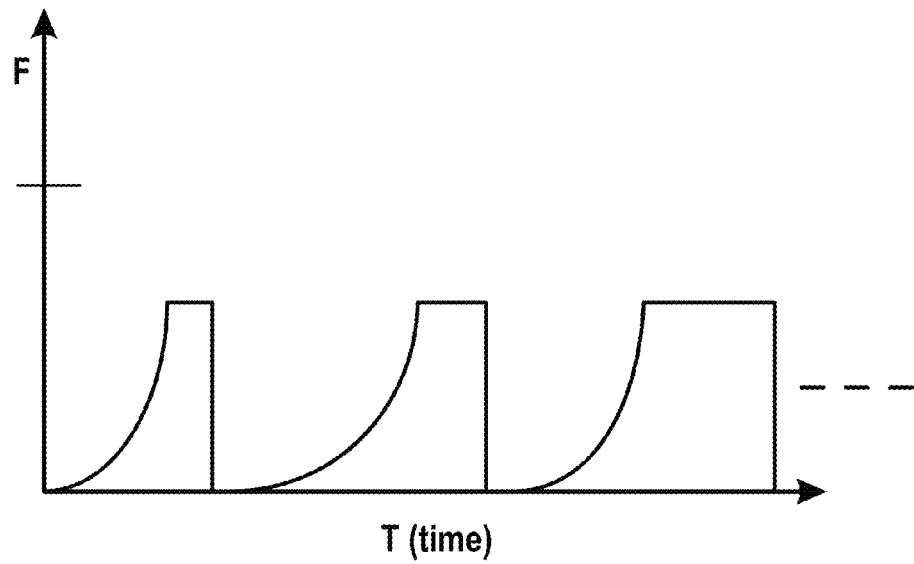
FIG. 7A illustrates a test sweep generated using a transient frequency and force method in accordance with one embodiment of the present disclosure.
Figure 7B:
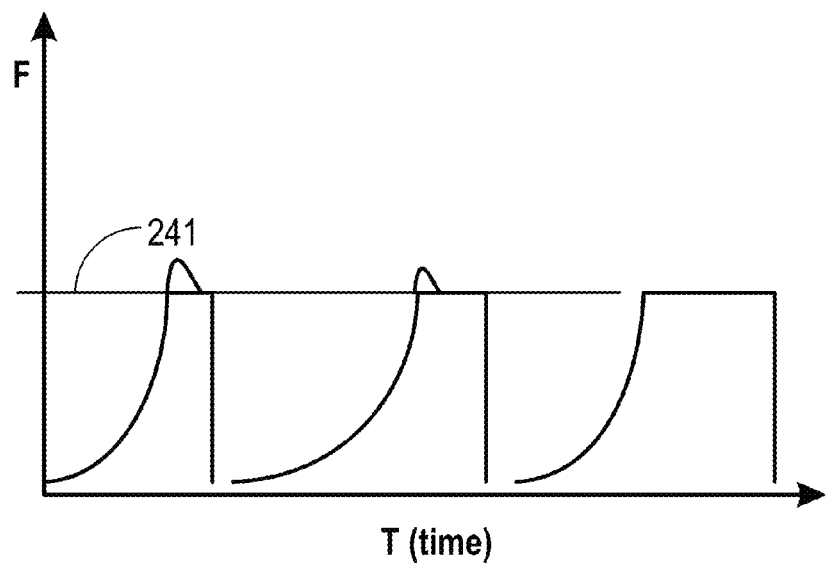
FIG. 7B illustrates a transient force identified using the FIG. 7A test sweep.

FIGS. 7A-B show the transient frequency sweep and frequency method. The graph shows driving force (F) versus time (T) and represents an illustrative force profile at a selected frequency. As shown in FIG. 7A, the force is ramped up and the time is increased. The transient force may be ramped by first determining the force possible due to reaction mass displacement limits as follows:

To find the maximum theoretical fundamental peak force at low frequencies:

$$\text{Max}[\sin(\omega \times t)]=1, a_{max}=|-A\times\omega^2|=A\times\omega^2$$

$$F=m\times A\times\omega^2$$

Where:
m is the mass of the reaction mass, $m_{RM}$
A is the peak amplitude of displacement of reaction mass
$A=S_{RM}/2$, $S_{RM}$ is the usable stroke
$\omega=2\times\pi\times f$, f is frequency $$F=m_{RM}\times S_{RM}/2\times(2\times\pi\times f)^2$$

The driving force are varied by percentages (e.g., 100%, 95%, 90%, 85%, 80%, etc.). With reference to FIG. 7B, the force that has the lowest fundamental force overshoot may be selected, here force 241. This process is performed at all the frequencies in the desired frequency range to generate a data set of force values and associated frequencies. Thus, the transient force and frequency sweep generally estimates a driving force by: sweeping through a selected frequency range; remaining at each frequency for varying time periods; and applying more than one selected force that ranges from a nominal force to an estimated maximum force. This process is performed at all the frequencies in the desired frequency range to generate a data set of force values and associated frequencies. Thus, generally, the transient force method estimates more than one driving force at each frequency by applying a selected force that ranges from a nominal force to an estimated maximum force.

FIGS. 4B, 5B, 6B, and 7B illustrate output forces associated with target force sweeps. A variety of methods and devices may be used to evaluate system behavior, such as distortion and steady state condition, in response to an applied target force sweep. For example, acoustical sensors, velocity sensors, and motion sensors such as accelerometers, load cells, peak particle velocity sensors, subsurface seismic sensors, and surface geophones may be used to evaluate system responses. Also, the value for the driving force may be selected using a model that uses measurements of one or more system parameters. These parameters include, but are not limited to, fundamental signal-conveying media force, peak signal-conveying media force, reaction mass fundamental force, reaction mass peak force, baseplate fundamental force, baseplate peak force, total ground force distortion, harmonic ground force distortion, total reaction mass distortion, harmonic reaction mass distortion, total base plate distortion, harmonic baseplate distortion, stiffness estimate of signal-conveying media, viscosity estimate of signal-conveying media, phase of signal-conveying force vs. target force, phase of accelerometers of reaction mass and baseplate, etc.

As should be appreciated, each of the techniques discussed above employ different strategies for developing a force profile. Each strategy may be based on different assumptions, and may rely on different criteria for identifying a preferred force for a particular frequency. That is, the relevance of these techniques may depend on a particular vibrator truck configuration, formation lithology, surface conditions (e.g., dry land, mud, water, etc.), seismic spread design, etc.

Figure 3A:
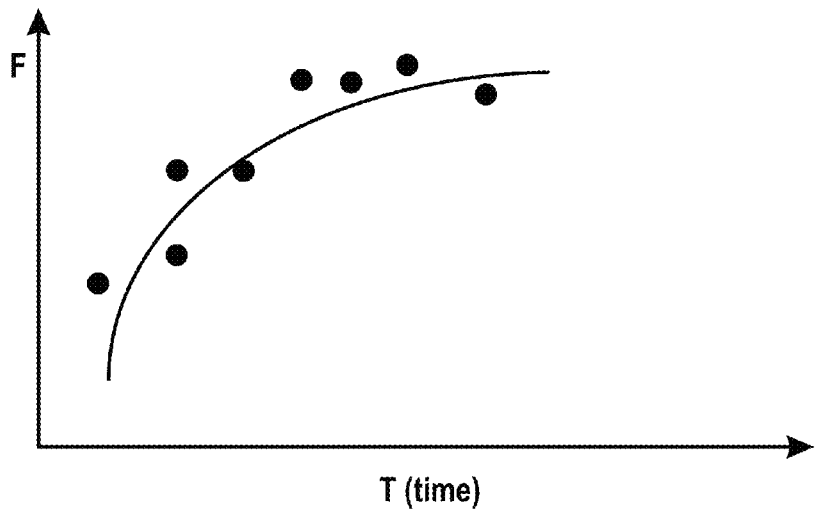
FIG. 3A illustrates an exemplary curve fitting methodology that may be used to generate a target sweep.

Referring back to FIG. 3, the force profiles 204-210 are correlated or combined in some manner to arrive at the composite force profile 202. The force profile 202, which is a data set of force values, may then be used to develop a target sweep. Known methods such as interpolation, smoothing, extrapolation, regression analysis, statistical interference, polynomial equation, and curve fitting may be used to develop a target sweep. An exemplary curve fitting is shown in FIG. 3A. The FIG. 3A curve fitting shows an instance wherein a curve "best fits," but does not intersect, the known data points. In other instances, the curve fitting may generate a curve that intersects all of the data points. When this happens, the curve fitting may be used to estimate values for points between the known points. The composite force profile 202 may be used to generate a target sweep, such as the illustrative target sweep 242 shown in FIG. 8.

Figure 8:
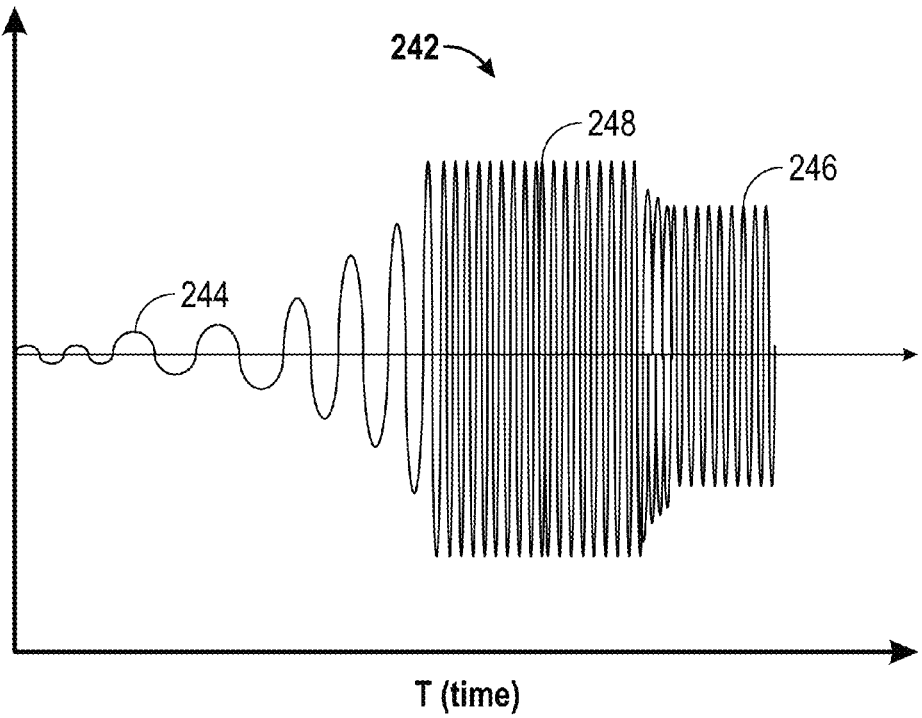
FIG. 8 illustrates a target seismic sweep generated using the FIG. 3 method in accordance with one embodiment of the present disclosure.
Figure 9:
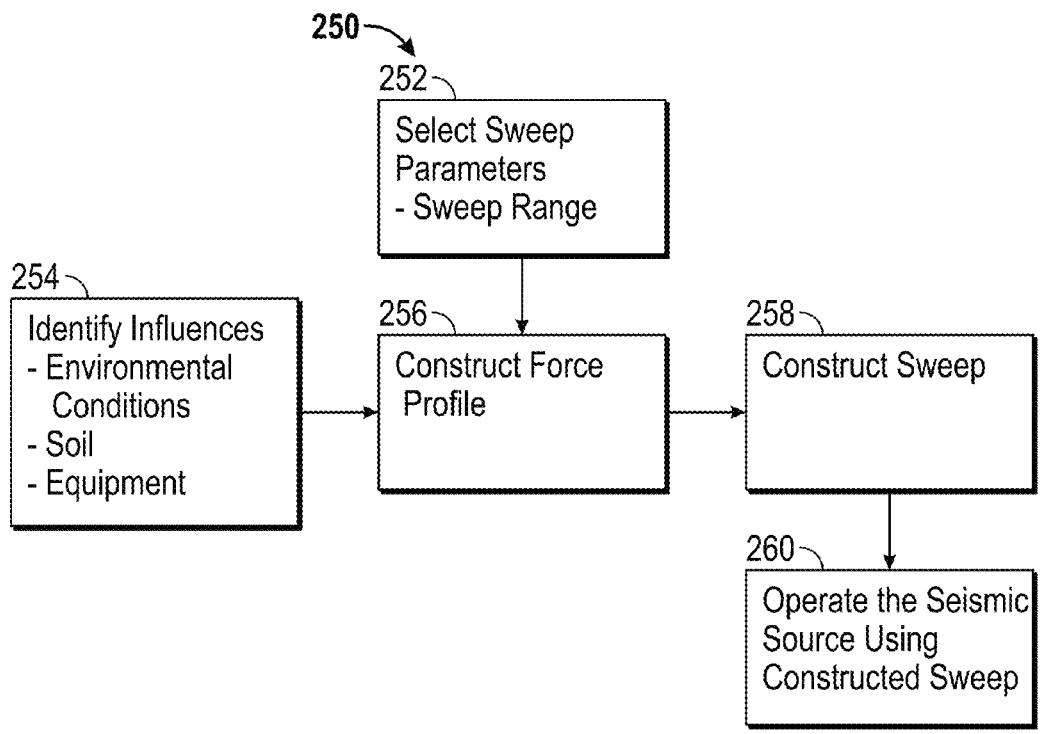
FIG. 9 illustrates a method for constructing a target sweep in accordance with one embodiment of the present disclosure.

FIG. 9 shows an illustrative method 250 for generating an enhanced frequency seismic sweep such as that shown in FIG. 8. For instance, referring to FIG. 8. The method 250 (FIG. 9) may be used to shape the sweep at the low frequency range 244, at the high frequency range 246, and/or at the mid-frequency range 248. Referring now to FIG. 9, the method 250 includes a step 252 of setting the desired parameters for the sweep, which may include setting an upper and lower frequency. At step 254, information relating to the factors that may influence the seismic sweep is collected and assessed. This information may include, but not be limited to: equipment operating set-points, capacities, and limitations; environmental conditions such as temperature and climate conditions; lithology of the earth or the media conveying the seismic signal; and the nature of the acoustic coupling between the vibrator and the earth. This information may be measured and/or calculated. At step 256, the FIG. 3 method may be used, together with the information collected at steps 252 and 254, to obtain a composite force profile. At step 258, the obtained force profile is used to generate an enhanced sweep using known techniques. At step 260, the sweep is used in conjunction with the systems shown and described in connection with FIGS. 1-2 to generate seismic signals.

Merely for illustrative purposes, equations for generating sweeps are provided below. It should be appreciated that the present disclosure is not limited to these sweep equations. One skilled in the art will appreciate that the equations below merely indicate the general type and nature of mathematical modeling that may be used to generate sweeps. The resultant sweep based on the composite force profile may be constructed to meet the desired sweep performance by using one or more of the following sweep equations. This is often referred to as segmented sweeps.

A linear sweep wherein a frequency variation versus time is liner may be expressed as follows:

$$S(t) = A \sin\left[2\pi F_{st} t + \pi\left\{\frac{F_{end} - F_{st}}{T_{length}}\right\} t^2\right]$$

Where:
$F_t$—instantaneous frequency (Hz)
$F_{st}$—start frequency (Hz)
$F_{end}$—end frequency (Hz)
$T_{length}$—Sweep length (seconds)
t—instantaneous time (second)
A—amplitude of the linear sweep A dB/Hz non-linear sweep wherein a frequency variation versus time is liner may be expressed as follows:

$S(t) = A \sin[\Phi(t)]$ dB/Hz

Where $\Phi(t)$ may be expressed as:

$$\Phi(t) = 2\pi\left\{F_{st} t + \beta \times \left[\left(\frac{1}{\alpha} + t\right) \times \log_e(1 + \alpha t) - t\right]\right\}$$

where $$\beta = \frac{20}{\gamma \times \log_e(10)}$$

$$\alpha = \frac{e^{\left(\frac{F_{end} - F_{st}}{\beta}\right)} - 1}{T_{length}}$$

$\log_e$—natural logarith

A dB/Octave non-linear sweep wherein a frequency variation versus time is liner may be expressed as follows:

$S(t) = A \sin[\Phi(t)]$ dB/Oct

Where $\Phi(t)$ may be expressed as:

$$\Phi(t) = 2\pi\left\{\left[F_{st}^{\left(\frac{N+6}{6}\right)} + \left[\frac{F_{end}^{\left(\frac{N+6}{6}\right)} - F_{st}^{\left(\frac{N+6}{6}\right)}}{T_{length}}\right] t\right]^{\left(\frac{N+12}{N+6}\right)} - F_{st}^{\left(\frac{N+6}{6}\right)} \times F_{st}\right\} \times$$

$$\left\{\frac{(N+6)T_{length}}{(N+12)\left[F_{end}^{\left(\frac{N+6}{6}\right)} - F_{st}^{\left(\frac{N+6}{6}\right)}\right]}\right\}$$

where N=Constant×0.01

A T-power sweep wherein a frequency variation versus time is liner may be expressed as follows:

$S(t) = A \sin[\Phi(t)]$ (T-power)

Where $\Phi(t)$ may be expressed as $$\Phi(t) = 2\pi\left\{F_{st} t + \left(\frac{F_{end} - F_{st}}{(N+1)T_{length}^N}\right) t^{N+1}\right\}$$

For target frequency determination, the power spectrum of a linear sweep may be selected as the target spectrum. Therefore, in the frequency domain, the power spectrum can be defined as the force level which is a constant value multiplied by the instantaneous frequency. For the power spectrum, P(f), it can be expressed as the following equation:

$$P(f) = F_{max}\left(\frac{f}{f_p}\right)^n e^{-\frac{1}{m}\left(\frac{f}{f_p}\right)^m}$$

Where $f_p$ is corner frequency; m is the constant which defines the function types, for example, when m=2, the function follows the Gaussian; and n is the order of derivative.

A lower plot of the power spectrum may be given by the following equation:

$$p(f) = \left(\frac{2}{\pi}\right) P(f_u - f_l) \sin^2\left[\frac{1}{3}\pi(f - f_l)/(f_u - f_l)\right]$$

where $f_l$ is the lower frequency boundary and $f_u$ is the upper frequency boundary.

An upper plot of the power spectrum may be given by the following equation:

$P(f) = (f-f_l)(f_u-f)(f_l+f_u-2f)^2 + \epsilon$ where $\epsilon$ is a small constant greater than zero that may be added to avoid numerical problems associated with zero power at particular frequencies.

The composite methods of the present disclosure may be used to build any sweep that can be expressed or modeled mathematically and programmed into an information processing device such as a computer. Thus, any target power spectrum may be achieved as long as the phase equation or sweep rate can be determined mathematically. The target power spectrum, sweep length, or target force can change the composite force profile.

In some embodiments, steps 252-258 may be performed in a first information processing device (e.g., a computer programmed with instructions, algorithms, software, etc.) and the target sweep (e.g., target sweep 240 of FIG. 8) may be inputted into the controller programmed to control a vibrating seismic source (e.g., controller 108 of FIG. 2). In other embodiments, steps 252-258 may all be performed at the controller programmed to control a vibrating seismic source (e.g., controller 108 of FIG. 2). Thus, it should be appreciated that a computer-readable medium may include a computer program that executes some or all of the steps of the method 250. The target sweep may be inputted into a controller/processor via any media type (removable or fixed [RAM, Flash, NVRAM, EEPROM, etc.]) or with any wireless or cabled method. Additionally, a table, matrix, or force profile may be inputted into a controller/processor using any of these methods.

Portions of the present disclosure pertaining to "software aspects" of the disclosure are used herein. These aspects include detailed description and claims in terms of logic, software or software implemented aspects typically encoded on a variety of media including, but not limited to, computer-readable media, machine-readable media, program storage media, or computer program product. Such media may be handled, read, sensed and/or interpreted by an information processing device. Those skilled in the art will appreciate that such media may take various forms such as cards, tapes, magnetic disks (e.g., floppy disk or hard drive) and optical disks (e.g., compact disk read only memory ("CD-ROM") or digital versatile (or video) disc ("DVD")). Any embodiment disclosed herein is for illustration only and not by way of limiting the scope of the disclosure or claims.

The term "information processing device," "processor," "computer," or "controller" as used herein includes, but is not limited to, any device that transmits, receives, manipulates, converts, calculates, modulates, transposes, carries, stores or otherwise utilizes information. In several non-limiting aspects of the disclosure, an information processing device includes a computer that executes programmed instructions for performing various methods.

We claim:

1. A method of performing a seismic sweep using a seismic source, comprising:
    forming a composite force profile of the seismic source by combining at least two force profiles, the at least two force profiles comprising at least two of:
        a force profile using one or more steady state sweeps,
        a force profile using one or more transient force sweeps,
        a force profile using one or more transient frequency sweeps, and
        a force profile using one or more transient force and frequency sweeps;
    constructing a target seismic frequency sweep using the composite force profile; and
    operating the seismic source using the constructed target frequency seismic sweep.

2. The method of claim 1, further comprising:
    obtaining the force profile using one or more steady state sweeps by applying one or more selected forces for a predetermined time period and estimating a driving force at each frequency.

3. The method of claim 2, wherein the predetermined time period is selected to cause the driving force to at least exceed a transient response.

4. The method of claim 1, further comprising:
    obtaining the force profile using one or more transient force sweeps by applying a selected force that ranges from a nominal force to an estimated maximum force and estimating more than one driving force at each frequency.

5. The method of claim 1, further comprising:
    obtaining the force profile using one or more transient frequency sweeps by sweeping through a selected frequency range, remaining at each frequency for varying time periods and estimating a driving force at each frequency.

6. The method of claim 1, further comprising:
    obtaining the force profile using one or more transient force and frequency sweeps by estimating a driving force by sweeping through a selected frequency range; remaining at each frequency for varying time periods; and applying more than one selected forces that range from a nominal force to an estimated maximum force.

7. The method of claim 1 wherein the composite force profile is formed by combining the at least two force profiles using a weighted average method.

8. The method of claim 1, further comprising inputting the target seismic sweep into a programmable controller configured to operate the seismic source.

9. The method of claim 1, wherein the target seismic sweep is constructed by a programmable controller configured to operate the seismic source; and further comprising inputting the composite force profile into the programmable controller.

10. The method of claim 1, wherein the composite force profile is adjusted for at least one parameter selected from: (i) an environmental parameter, (ii) an equipment parameter, and (iii) a signal-conveying media parameter.

11. The method of claim 1, further comprising: collecting information relating the seismic source to form a pre-existing database before performing the seismic sweep; and wherein the composite force profile is based at least partially on the pre-existing database.

12. The method of claim 1, wherein the target frequency seismic sweep includes at least one of:
    a frequency sweep that includes a single frequency;
    a frequency sweep that increases frequency with time;
    a frequency sweep that decreases frequency with time;
    a frequency sweep that includes a single frequency and increasing frequencies;
    a frequency sweep that includes a single frequency and decreasing frequencies; and
    a frequency sweep that includes a single frequency and increasing frequencies and decreasing frequencies.

13. A computer-readable medium product having stored thereon instructions that, when executed by at least one processor, cause the at least one processor to perform a method of performing a seismic sweep using a seismic source, the method comprising:
    forming a composite force profile of the seismic source by combining at least two force profiles, the at least two force profiles comprising at least two of:
        a force profile using one or more steady state sweeps,
        a force profile using one or more transient force sweeps,
        a force profile using one or more transient frequency sweeps, and
        a force profile using one or more transient force and frequency sweeps;
    constructing a target seismic frequency sweep using the composite force profile; and
    operating the seismic source using the constructed target frequency seismic sweep.

* * * * *